Figure 1:
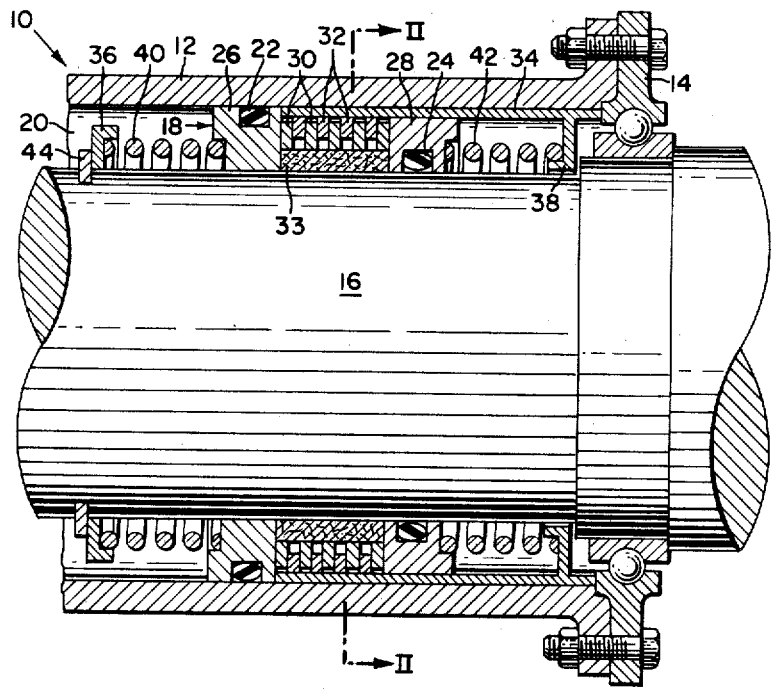

Feb. 16, 1965  F. L. MACALUSO  3,169,775
MULTI-BEARING SEAL FOR ROTATABLE ELEMENTS
Filed Aug. 30, 1962

INVENTOR.
FRANCIS L. MACALUSO
BY
George J. Rubens
ATTORNEY

United States Patent Office 3,169,775
Patented Feb. 16, 1965

3,169,775
MULTI-BEARING SEAL FOR ROTATABLE
ELEMENTS
Francis L. Macaluso, Baltimore, Md., assignor, by mesne assignments, to the United States of America as represented by the Secretary of the Navy
Filed Aug. 30, 1962, Ser. No. 220,969
2 Claims. (Cl. 277—65)

This invention relates to seals for relatively rotatable elements, and more particularly to such a seal having a plurality of bearing surfaces for sharing the frictional load thereby increasing the life of the seal.

One application of the seal of this invention is to restrict the axial flow of fluids between the outside of a shaft and the inside of a shaft housing, such as a rotating feed horn and a feed horn base of an antenna installation. Presently constructed seals consist of a pair of O-rings, each seated in a respective annular retainer, one O-ring contacting the shaft and the other O-ring facing in the opposite direction to contact the housing. The respective retainer and O-ring engaging the movable element is rotatable therewith so that there is practically no relative motion between the O-rings and their contacting surfaces. The relative motion between the O-ring assemblies occurs on the sides or contacting surfaces of the O-ring retainers. In order to seal against the flow of air; to ensure free rotation; and to wear well, great care has been exercised in the selection of the material for the rubbing surfaces of the O-ring casings, such as employing chrome-plated "Alnico" and graphite. Other materials have been used such as "Micarta," "Oilite," and "Rulon."

Despite the careful selection of the bearing surfaces, the prior art seals have limited life causing increased driving torque that made the installation inoperative within a relatively short period of time and requiring maintenance.

The instant invention seal has a materially greater life by providing a plurality of pairs of bearing surfaces which successively share the frictional load between the rotatable parts of the seal. Since in practice the coefficients of friction at each of the pairs of bearing surfaces will be different, all or a great part of the relative motion will occur at the respective pair of bearing surfaces with the least coefficient of friction. When the coefficient of friction increases at the surfaces where all or most of the relative motion has occurred such as when the respective bearing wears out, relative motion will begin or increase at the pair of surfaces which originally had the second lowest value of coefficient of friction and so on. This transfer, or sharing, from one pair of surfaces to another will continue until the cefficients of friction on all becomes so great that acceptable driving torque is exceeded. A reservoir is provided in the seal assembly to replenish the bearing surfaces with a lubricant.

One object of this invention is to provide a seal which will share the frictional load among a plurality of pairs of bearing surfaces, each pair having a different coefficient of friction.

Still another object is to provide such a seal with a reservoir of lubricant.

Figure 2:
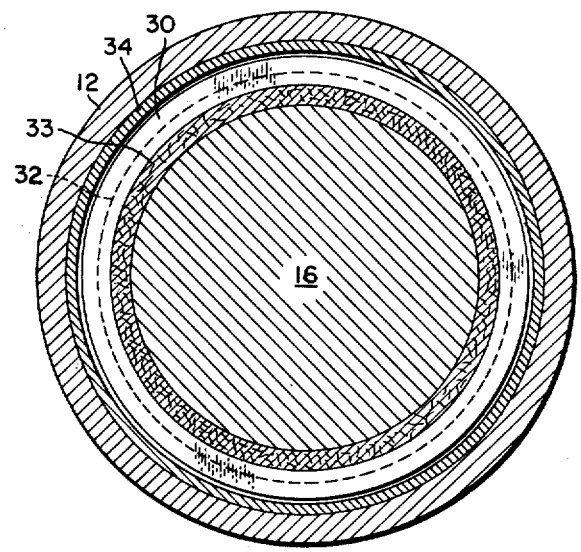

Other objects and many of the attendant advantages of this invention will be readily appreciated as the same becomes better understood by reference to the following detailed description when considered in connection with the accompanying drawings wherein:

FIG. 1 is a longitudinal section of the invention seal for use on an antenna feed horn assembly; and FIG. 2 is a transverse section taken along line II—II of FIG. 1.

Referring to the figures where like reference numerals refer to similar parts throughout the drawing there is shown in FIG. 1 one type of rotatable apparatus on which the invention seal is usable, namely, a feed horn antenna 10. Antenna 10 includes a feed horn housing 12 rotatably supported by a flange bearing 14 on a transition shaft 16. A seal assembly 18 constructed according to the present invention is positioned in an annular space 20 between the housing and the shaft, the seal restricting the axial flow of fluids therebetween.

Seal assembly 18 comprises a pair of O-rings 22 and 24 suitably seated in U-shaped retainers 26 and 28, respectively, the retainers being ring-shaped to slidably fit over shaft 16 and within annular space 20. The mouth of retainer 26 is directed radially outwardly so that respective O-ring 22 seated therein engages feed horn housing 12 and rotates therewith. The mouth of retainer 28 is directed radially inwardly so that respective O-ring 24 seated therein engages the stationary transition shaft 16 and remains fixed therewith.

Positioned between retainers 26 and 28 are a plurality of bearing elements constructed in the shape of washers, there being a set of five washers 30 made of a bearing material alternatively spaced with a set of four mating steel washers 32 creating therebetween and with the O-ring retainers ten contacting surfaces. Bearing washers 30 may be made of "Oilite" or other equivalent bearing material. The core diameters of washers 30 and 32 are larger than the outer diameter of transition shaft 16 to provide space for a sleeve of absorbent material 33, such as felt, which serves as a lubricant reservoir. Bearing washers 30 contact the lubricant saturated sleeve to replenish the bearing surfaces with lubricating oil.

O-ring retainers 26 and 28 and the bearing surfaces are maintained in assembled relation by a pair of retainer washers 36 and 38, the latter formed integral with spacer sleeve 34, and a pair of compression coil springs 40 and 42, positioned between the O-ring retainers and seated therein. A snap ring 44 seated in shaft 16 and abutting washer 36 permits ease in maintenance. The pressure of spring 40 may be assisted by air pressure.

Since in normal manufacturing practice, the coefficients of friction at each of the ten contacting surfaces will be randomly different, all or a great part of the relative motion in the seal elements will occur at the respective pairs of surfaces having the least coefficient of friction. When the coefficient of friction increases at the surfaces where most of the relative motion has occurred as will occur when the respective bearing washer is worn out, relative motion will begin or increase at the surface which originally had the second lowest coefficient of friction. This transfer of the friction load from one surface to another, or sharing, will continue until the coefficients of friction on all contacting surfaces becomes so great that acceptable driving torque is exceeded. The life of the seal is materially increased as compared to a seal having only one pair of contacting surfaces.

Although it is believed that the conventional machining of washers 30 and 32 will normally provide an adequate difference in coefficients of friction among the various contacting surfaces, a more precise method of obtaining the desired coefficient of friction can be employed.

According to the present invention there is provided a seal for rotating parts which has a materially greater life, an important consideration in remote installation where normal maintenance is not available or convenient. The seal is of simple and inexpensive design and readily removed and installed.

Obviously many modifications and variations of the present invention are possible in the light of the above teachings. It is therefore to be understood that within the scope of the appended claims the invention may be practiced otherwise than as specifically described.

I claim:
1. A seal between a relatively rotatable shaft in a shaft housing comprising:
   (a) two spaced ring-shaped retainer members each housing an O-ring, one O-ring directed radially outwardly to contact the housing, another O-ring directed radially inwardly to contact the shaft;
   (b) a plurality of washers positioned between said retainer members, alternate washers being made of a bearing material forming pairs of respective bearing surfaces; each of said washers having a bore diameter greater than the diameter of said shaft providing a hollow space therebetween;
   (c) at least a portion of said washers having contacting surfaces with different coefficients of friction;
   (d) a sleeve of absorbent material capable of maintaining a reservoir of a lubricant positioned in said hollow space;
   (e) spring means for maintaining said retainers and washers in assembled relation;
   (f) whereby relative motion occurs substantially successively between the bearing surfaces respectively in the order of their coefficients of friction starting with the bearing surface having the least coefficient of friction.

2. The seal of claim 1 wherein said bore surface of the bearing washers engage said absorbent material.

References Cited by the Examiner
UNITED STATES PATENTS

| | | | |
|---|---|---|---|
| 707,043 | 8/02 | Wilmot et al. | 277—174 |
| 873,444 | 12/07 | Luburg. | |
| 2,819,101 | 1/58 | Luenberger | 277—83 |

EDWARD V. BENHAM, *Primary Examiner.*
SAMUEL ROTHBERG, *Examiner.*